United States Patent
Gao

(10) Patent No.: US 11,842,751 B2
(45) Date of Patent: Dec. 12, 2023

(54) CALL METHOD, APPARATUS, AND SYSTEM, SERVER, AND STORAGE MEDIUM

(71) Applicant: TENCENT TECHNOLOGY (SHENZHEN) COMPANY LIMITED, Shenzhen (CN)

(72) Inventor: Yi Gao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 152 days.

(21) Appl. No.: 17/507,761

(22) Filed: Oct. 21, 2021

(65) Prior Publication Data
US 2022/0044699 A1 Feb. 10, 2022

Related U.S. Application Data

(63) Continuation of application No. PCT/CN2020/095486, filed on Jun. 11, 2020.

(30) Foreign Application Priority Data

Dec. 23, 2019 (CN) .......................... 201911334137.X

(51) Int. Cl.
*G10L 25/78* (2013.01)
*G10L 25/21* (2013.01)
(Continued)

(52) U.S. Cl.
CPC .............. *G10L 25/78* (2013.01); *G10L 25/21* (2013.01); *G10L 25/51* (2013.01);
(Continued)

(58) Field of Classification Search
CPC ......... G10L 25/21; G10L 25/51; G10L 25/78; H04L 65/1069; H04L 65/4038; H04L 65/765; H04L 65/80; H04M 3/568
See application file for complete search history.

(56) References Cited

U.S. PATENT DOCUMENTS 7,599,834 B2 * 10/2009 Raad ..................... H04M 3/568
379/202.01
8,331,585 B2 12/2012 Hagen et al.
(Continued)

FOREIGN PATENT DOCUMENTS

CN 101252452 A 8/2008
CN 101471804 B 8/2011
(Continued)

OTHER PUBLICATIONS

The European Patent Office (EPO) Extended Search Report for EP Application No. 20907597.7 dated Sep. 9, 2022 7 Pages.
(Continued)

*Primary Examiner* — Thomas J Dailey
(74) *Attorney, Agent, or Firm* — ANOVA LAW GROUP PLLC

(57) ABSTRACT

A call method is provided. The method includes: obtaining at least three paths of voice data transmitted by at least three first terminals, the voice data carrying indication information; selecting at least two paths of target voice data from the at least three paths of voice data according to the indication information of the at least three paths of voice data as obtained; and transmitting the at least two paths of target voice data to a second terminal, the second terminal being configured to decode the at least two paths of target voice data, mix decoded at least two paths of target voice data, and play mixed voice data.

18 Claims, 10 Drawing Sheets

(51) Int. Cl.
*G10L 25/51* (2013.01)
*H04L 65/4038* (2022.01)
*H04L 65/75* (2022.01)
*H04L 65/1069* (2022.01)
*H04M 3/56* (2006.01)
*H04L 65/80* (2022.01)

(52) U.S. Cl.
CPC ...... *H04L 65/1069* (2013.01); *H04L 65/4038* (2013.01); *H04L 65/765* (2022.05); *H04L 65/80* (2013.01); *H04M 3/568* (2013.01)

(56) References Cited

U.S. PATENT DOCUMENTS

| | | | |
|---|---|---|---|
| 8,791,982 | B1 | 7/2014 | Ellner |
| 8,954,324 | B2 * | 2/2015 | Wang ............... G10L 25/78 704/218 |
| 10,250,975 | B1 * | 4/2019 | Yang ............... H04R 3/007 |
| 10,326,886 | B1 * | 6/2019 | John Chuan ........ H04L 65/1045 |
| 10,614,831 | B2 * | 4/2020 | Jarvis ............... G10L 17/00 |
| 2007/0230372 | A1 * | 10/2007 | He ............... H04L 65/403 370/260 |
| 2007/0237099 | A1 | 10/2007 | He et al. |
| 2010/0183126 | A1 | 7/2010 | Chambers et al. |
| 2010/0268541 | A1 | 10/2010 | Li |
| 2013/0077538 | A1 * | 3/2013 | Plotnikov ........... H04L 12/1827 370/260 |
| 2016/0261653 | A1 | 9/2016 | Kim |

FOREIGN PATENT DOCUMENTS

| | | |
|---|---|---|
| CN | 102436818 A | 5/2012 |
| CN | 103337242 A | 10/2013 |
| CN | 104200811 A | 12/2014 |
| CN | 105304079 A | 2/2016 |
| CN | 105957520 A | 9/2016 |
| CN | 107635082 A | 1/2018 |
| CN | 107733631 A | 2/2018 |
| CN | 107733848 A | 2/2018 |
| CN | 108206817 A | 6/2018 |
| CN | 108881783 A | 11/2018 |
| CN | 109331470 A | 2/2019 |
| CN | 111049848 A | 4/2020 |
| JP | 2008141505 A | 6/2008 |
| WO | 2015130508 A2 | 9/2015 |

OTHER PUBLICATIONS

The State Intellectual Property Office of the People's Republic of China (SIPO) Office Action 1 for for 201911334137.X dated Feb. 22, 2021 9 Pages (including translation).
The World Intellectual Property Organization (WIPO) International Search Report for PCT/CN2020/095486 dated Sep. 7, 2020 6 Pages (including translation).
The Japan Patent Office (JPO) Notification of Reasons for Refusal for Application No. 2022-514029 and Translation dated Mar. 20, 2023 6 Pages.

\* cited by examiner

CALL METHOD, APPARATUS, AND SYSTEM, SERVER, AND STORAGE MEDIUM

RELATED APPLICATION

This application is a continuation application of PCT Patent Application No. PCT/CN2020/095486 filed on Jun. 11, 2020, which claims priority to Chinese Patent Application No. 201911334137.X, entitled "CALL METHOD, APPARATUS, AND SYSTEM, SERVER, AND STORAGE MEDIUM" filed on Dec. 23, 2019, all of which are incorporated by reference in entirety.

FIELD OF THE TECHNOLOGY

The present disclosure relates to the field of Internet technologies, and more particularly, to a call method, apparatus, and system, a server, and a storage medium.

BACKGROUND

As Internet technologies advance, a call function has been widely applied. A plurality of users may be on a call, which greatly facilitates communication between the plurality of users, thereby increasing convenience in daily life.

For example, a plurality of first terminals and a second terminal are on a call. The plurality of first terminals and the second terminal respectively transmit voice data to a server. The server transmits a plurality of paths of voice data transmitted by the plurality of first terminals to the second terminal. After receiving the plurality of paths of voice data transmitted by the server, the second terminal decodes the plurality of paths of voice data, mixes decoded plurality of paths of voice data, and plays mixed voice data.

However, the server may need to transmit the plurality of paths of voice data to the second terminal. Therefore, more network bandwidth is occupied and more data traffic is consumed, which slows a transmission speed of voice data, thereby affecting call quality.

SUMMARY

According to embodiments of the present disclosure, a call method, apparatus, and system, a server, and a storage medium are provided.

In one aspect, the present disclosure provides a call method, performed by a server, and including: obtaining paths of voice data transmitted by at least three first terminals, the paths of voice data each carrying a piece of indication information, the piece of indication information including at least a piece of voice activity detection (VAD) information, the piece of VAD information being configured for indicating whether the corresponding path of voice data includes a voice segment; selecting at least two paths of target voice data from the at least three paths of voice data according to the pieces of indication information of the at least three paths of voice data as obtained, a number of paths of the at least two paths of target voice data being less than a number of paths of the at least three paths of voice data; and transmitting the at least two paths of target voice data to a second terminal, the second terminal being configured to decode the at least two paths of target voice data, mix decoded at least two paths of target voice data, and play mixed voice data.

In another aspect, the present disclosure provides a call apparatus, the call apparatus including: a memory storing computer program instructions; and a processor coupled to the memory and configured to execute the computer program instructions and perform: obtaining at least three paths of voice data transmitted by at least three first terminals, the at least three paths of voice data each carrying a piece of indication information, the piece of indication information including at least a piece of voice activity detection (VAD) information, the piece of VAD information being configured for indicating whether the corresponding path of voice data includes a voice segment; selecting at least two paths of target voice data from the at least three paths of voice data according to the pieces of indication information of the at least three paths of voice data as obtained, a number of paths of the at least two paths of target voice data being less than a number of paths of the at least three paths of voice data; and transmitting the at least two paths of target voice data to a second terminal, the second terminal being configured to decode the at least two paths of target voice data, mix decoded at least two paths of target voice data, and play mixed voice data, wherein the second terminal is any terminal in a call group, and the at least three first terminals are terminals in the call group that are different from the second terminal.

In yet another aspect, the present disclosure provides a non-transitory computer-readable storage medium storing computer program instructions executable by at least one processor to perform: obtaining at least three paths of voice data transmitted by at least three first terminals, the at least three paths of voice data each carrying a piece of indication information, the piece of indication information including at least a piece of voice activity detection (VAD) information, the piece of VAD information being configured for indicating whether the corresponding path of voice data includes a voice segment; selecting at least two paths of target voice data from the at least three paths of voice data according to the pieces of indication information of the at least three paths of voice data as obtained, a number of paths of the at least two paths of target voice data being less than a number of paths of the at least three paths of voice data; and transmitting the at least two paths of target voice data to a second terminal, the second terminal being configured to decode the at least two paths of target voice data, mix decoded at least two paths of target voice data, and play mixed voice data, wherein the second terminal is any terminal in a call group, and the at least three first terminals are terminals in the call group that are different from the second terminal.

Other aspects of the present disclosure can be understood by those skilled in the art in light of the description, the claims, and the drawings of the present disclosure.

Details of one or more embodiments of the present disclosure are provided in the accompanying drawings and descriptions below. Other features, objectives, and advantages of the present disclosure become apparent from the present disclosure, the drawings, and the claims.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In certain embodiments, the term "based on" is employed herein interchangeably with the term "according to."

Figure 1:
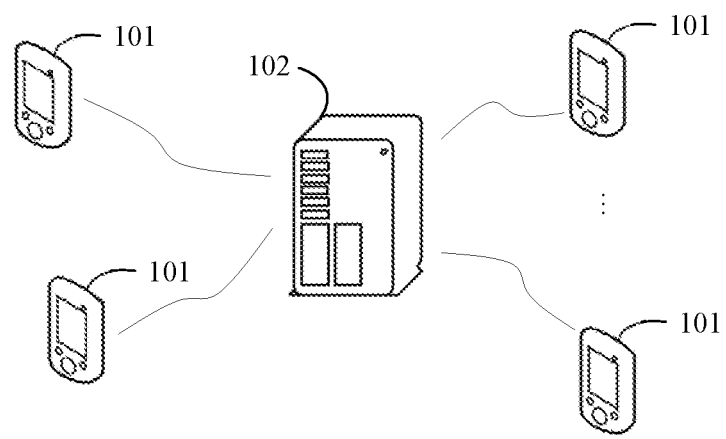
FIG. 1 is a schematic diagram of an implementation environment according to one or more embodiments of the present disclosure.

FIG. 1 is a schematic diagram of an implementation environment according to an embodiment of the present disclosure. Referring to FIG. 1, the implementation environment includes: a plurality of terminals 101, and a server 102. Each terminal 101 is connected to the server 102 through a network. The server 102 transmits received voice data transmitted by one terminal 101 to another terminal 101. During a call, each terminal 101 may be a transmitting terminal or a receiving terminal.

The terminals 101 may be various types of devices such as mobile phones, tablet computers, and so on. The server 102 may be one server, a server cluster including several servers, or a cloud computing service center.

Figure 2:
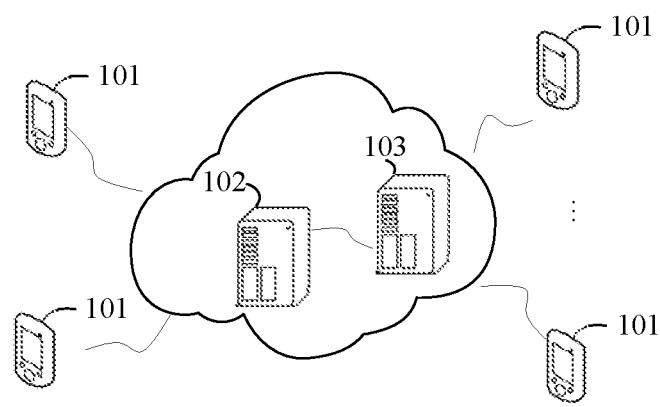
FIG. 2 is a schematic diagram of another implementation environment according to one or more embodiments of the present disclosure.

In certain embodiments, as shown in FIG. 2, an implementation environment further includes a control server 103. The plurality of terminals 101 are connected to the control server 103, and the server 102 is connected to the control server 103.

In certain embodiments, the plurality of terminals 101 are connected to the control server 103. The control server 103 and the terminals 101 exchange information through signaling. The signaling is information configured for establishing, maintaining, or canceling communication relationships between the terminals 101. During information exchange, terminals that are on a call transmit their identifiers to the control server 103. The control server 103 determines multiple terminals 101 in the same call group according to the received identifiers of the multiple terminals 101. The control server 103 transmits the identifiers of the multiple terminals 101 in the same call group to the server 102, thereby allowing the server 102 to determine which terminals 101 are in the same call group.

The control server 103 may monitor whether a new terminal 101 participates the call, or whether any terminal 101 exits the call. After the call ends, the control server 103 disconnects data connection and signaling connection, to release resources.

Figure 3:
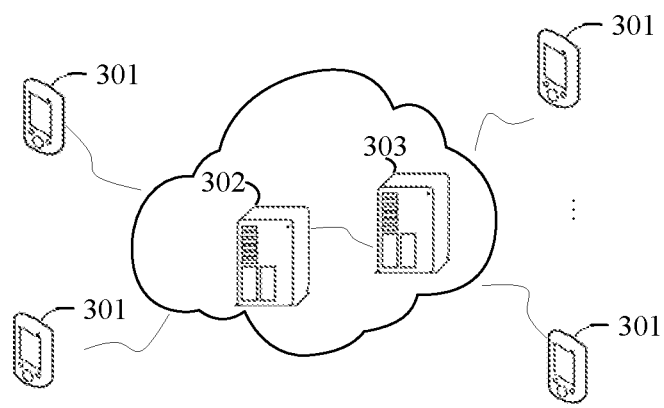
FIG. 3 is a schematic diagram of another implementation environment according to one or more embodiments of the present disclosure.

FIG. 3 is a schematic diagram of another implementation environment according to an embodiment of the present disclosure. Referring to FIG. 3, an implementation environment includes: a plurality of terminals 301, a first server 302, and a second server 303. The plurality of terminals 301 are connected to the first server 302, or connected to the second server 303. The first server 302 is connected to the second server 303.

The terminals 301 may be various types of devices such as mobile phones, tablet computers, and so on. The first server 302 and the second server 303 may be one server, or a server cluster including several servers, or a cloud computing service center.

For example, when or in response to determining that first terminals and a second terminal are in the same call group, the first terminals are transmitting terminals, the second terminal is a receiving terminal, the first terminals are connected to the first server, and the second terminal is connected to the second server, the first server receives voice data transmitted by the first terminals, and transmits the voice data to the second server. The second server receives the voice data transmitted by the first server, and transmits the voice data to the second terminal.

The method according to the embodiments of the present disclosure may be applied to a voice call, a video call, or other call scenes. The voice call or video call may be a Voice over Internet Protocol (VOIP) multi-person conference scene or another scene.

For example, in a scene of a voice call, an interaction of voice data is performed between at least four terminals. The server, by using the method according to the embodiments of the present disclosure, selects target voice data from at least three paths of voice data transmitted by at least three transmitting terminals, and transmits the target voice data to the receiving terminal. The receiving terminal decodes and mixes received target voice data, and plays mixed voice data.

For example, in a scene of a video call, an interaction of video data is performed between at least four terminals. The video data includes voice data and image data. The server processes the voice data and the image data in the video call respectively.

When processing the voice data, the server, by using the method according to the embodiments of the present disclosure, selects target voice data from at least three paths of voice data transmitted by at least three transmitting terminals, and transmits the target voice data to the receiving terminal. The receiving terminal decodes and mixes received target voice data, and plays mixed voice data.

When processing the image data, the server transmits pieces of image data transmitted by the at least three transmitting terminals to the receiving terminal. The receiving terminal determines a piece of image data to be displayed according to the received at least three pieces of image data and a locally acquired piece of image data, and displays the piece of image data to be displayed. The displayed piece of image data may be obtained by combining the received at least three pieces of image data and the locally acquired piece of image data, or may be a certain piece of image data selected by a user from the received at least three pieces of image data and the locally acquired piece of image data.

It may be desirable to ensure that the voice data and the image data are synchronous when the voice data and the image data are processed respectively.

Figure 4:
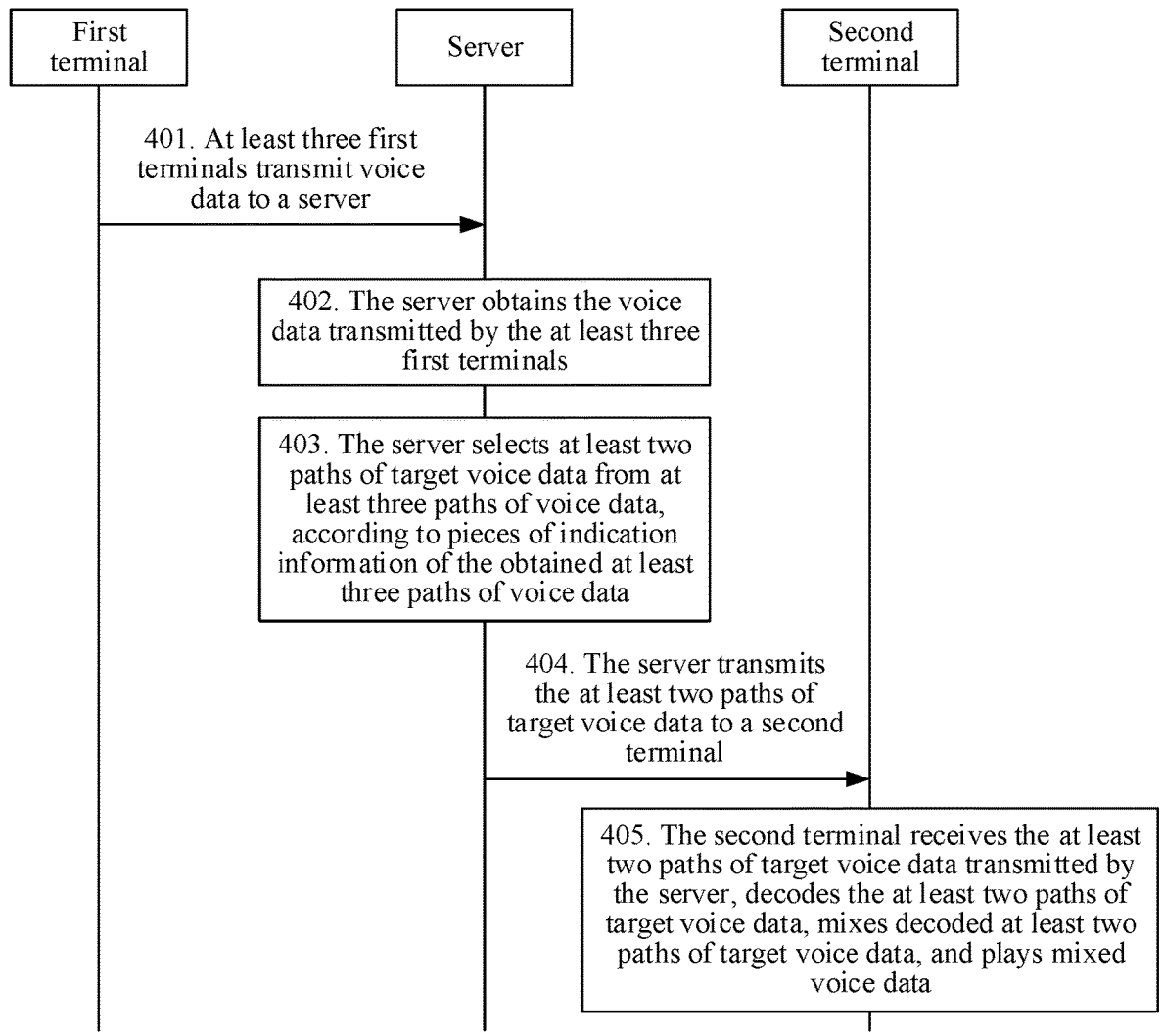
FIG. 4 is a schematic flowchart of a call method according to one or more embodiments of the present disclosure.

FIG. 4 is a flowchart of a call method according to an embodiment of the present disclosure. Interaction subjects in the embodiments of the present disclosure are first terminals, a server, and a second terminal. Referring to FIG. 4, the method includes:

401. At least three first terminals transmit voice data to a server.

In an embodiment of the present disclosure, at least four terminals participate in the same call group. Calls may be made between the at least four terminals. A transmitting terminal refers to a terminal that transmits voice data. A receiving terminal refers to a terminal that receives voice data transmitted by other terminals. The receiving terminal is any terminal in the call group. At least two transmitting terminals are terminals in the call group that is different from the receiving terminal. Each terminal in the call group may be either a transmitting terminal or a receiving terminal. For example, in the embodiments of the present disclosure, the first terminals are used as the transmitting terminals, and the second terminal is used as the receiving terminal. A processing process when or in response to determining that another terminal is used as the transmitting terminal or as the receiving terminal is similar to that of the exemplary implementation.

The call group may be a voice call group or a video call group. The at least four terminals may make a voice call or a video call. During the voice call, an interaction of voice data is performed between the at least four terminals. During the video call, an interaction of voice data is performed between the at least four terminals, and additionally, an interaction of image data is performed between the at least four terminals. The embodiments of the present disclosure only describe an interaction process of the voice data.

Each of the first terminals acquires a path of voice data, and transmits the path of voice data to the server. The path of voice data acquired by each of the first terminals may include one voice frame or a plurality of voice frames.

The path of voice data carries a piece of indication information. The piece of indication information includes a piece of voice activity detection (VAD) information. The piece of VAD information is configured for indicating whether the corresponding path of voice data includes a voice segment.

The piece of VAD information of the path of voice data includes a VAD identifier of each voice frame in the path of voice data. The VAD identifier includes two types of a first VAD identifier and a second VAD identifier. The first VAD identifier is configured for indicating that the corresponding voice frame is a voice segment. The second VAD identifier is configured for indicating that the corresponding voice frame is not a voice segment.

When or in response to determining that the piece of VAD information of the path of voice data includes the first VAD identifier, the path of voice data is determined to include a voice segment. When or in response to determining that the piece of VAD information of the path of voice data does not include the first VAD identifier, the path of voice data is determined to not include a voice segment. The first VAD identifier may be a preset value or another identifier. The second VAD identifier may be another identifier that is different from the first VAD identifier. For example, the first VAD identifier is 1, and the second VAD identifier is 0.

After acquiring the path of voice data, each of the first terminals may perform voice activity detection (VAD) on the path of voice data, to detect whether each voice frame in the path of voice data is a voice segment, namely whether each voice frame includes sound, so as to obtain the VAD identifier corresponding to each voice frame. The obtained VAD identifier of each voice frame is added into the path of voice data, so that the path of voice data carries the VAD identifier of each voice frame.

In certain embodiments, the piece of indication information also includes a voice energy. The voice energy is configured for indicating whether sound exists in a path of voice data. When or in response to determining that the path of voice data includes a voice segment, the voice energy is relatively large. When or in response to determining that the path of voice data does not include a voice segment, the voice energy is relatively small. Also, different voice segments have different voice energies.

For example, when no one is speaking, there is only background noise or no sound in a path of voice data. Therefore, the path of voice data does not include a voice segment, and has a small energy. When someone is speaking, the voice energy varies with a voice volume. If the voice volume is relatively large, the voice energy is relatively large; and if the voice volume is relatively small, the voice energy is relatively small.

After acquiring the path of voice data, each of the first terminals may calculate the voice energy of the path of voice data, and add the voice energy of the path of voice data into the path of voice data, so that the path of voice data carries the voice energy. When or in response to determining that the path of voice data includes only one voice frame, the voice energy of the path of voice data is a voice energy of the voice frame. When or in response to determining that the path of voice data includes a plurality of voice frames, the voice energy of the path of voice data may be a sum of voice energies of the plurality of voice frames.

In addition, a path of voice data may further include payload data. The payload data is configured for representing bitstream data obtained after encoding the path of voice data.

402. The server obtains the voice data transmitted by the at least three first terminals.

The server receives the voice data transmitted by the at least three first terminals, thereby obtaining at least three paths of voice data. The server may immediately process the at least three paths of voice data; or alternatively, buffer the at least three paths of voice data first, and later extract the buffered at least three paths of voice data, and process the at least three paths of voice data.

403. The server selects at least two paths of target voice data from at least three paths of voice data, according to obtained pieces of indication information of the at least three paths of voice data.

The server parses the at least three paths of voice data respectively, to obtain the piece of indication information carried in each path of voice data. The server selects at least two paths of target voice data from the at least three paths of voice data according to the obtained pieces of indication information.

A number of paths of the at least two paths of target voice data is not greater than a number of paths of the at least three paths of voice data. The server may select the at least two paths of target voice data from the at least three paths of voice data, to reduce the number of paths of voice data, thereby occupying less network bandwidth and consuming less data traffic when transmitting the paths of voice data to the second terminal. A preset number may be determined by counting a maximum number of people speaking at the same time during a general call, or may be determined according to a demand for the data traffic.

In an embodiment of the present disclosure, a process of selecting the paths of target voice data may include the following manners:

(1) The server selects at least two paths of target voice data that include voice segments from the at least three paths of voice data, according to the pieces of VAD information of the at least three paths of voice data.

That is, a path of voice data whose VAD information includes the first VAD identifier is selected from the at least three paths of voice data as a path of target voice data.

The server may traverse the at least three paths of voice data, to determine whether a piece of VAD information of a currently traversed path of voice data includes the first VAD identifier. If the piece of VAD information of the currently traversed path of voice data includes the first VAD identifier, the currently traversed path of voice data is determined as a path of target voice data, and a next path of voice data is continued to be traversed, until the at least three paths of voice data have all been traversed, thereby selecting the at least two paths of target voice data.

For example, a call group includes a terminal A, a terminal B, a terminal C, and a terminal D. If users corresponding to the terminal A, the terminal B, and the terminal C are speaking, while a user corresponding to the terminal D is not speaking, paths of voice data transmitted by the terminal A, the terminal B, and the terminal C include voice segments, and a path of voice data transmitted by the terminal D does not include a voice segment. When or in response to determining that the terminal C is used as the receiving terminal, and the terminal A, the terminal B, and the terminal D are used as the transmitting terminals, the server selects the paths of voice data transmitted by the terminal A and the terminal B from the three paths of voice data transmitted by the terminal A, the terminal B, and the terminal D as target voice data. Subsequently, the paths of voice data transmitted by the terminal A and the terminal B are transmitted to the terminal C, without transmitting the path of voice data transmitted by the terminal D to the terminal C.

(2) The server selects a preset number of paths of voice data that include voice segments and have largest voice energies from the at least three paths of voice data as a preset number of paths of target voice data, according to the pieces of VAD information and the voice energies of the at least three paths of voice data.

The preset number is less than the number of paths of the at least three paths of voice data. The preset number is an integer greater than 1 and less than the number of paths of the at least three paths of voice data.

The server selects the paths of voice data that include voice segments from the at least three paths of voice data, according to the pieces of VAD information of the at least three paths of voice data; and selects the preset number of paths of voice data having largest voice energies from the selected paths of voice data as the preset number of paths of target voice data, according to the voice energies of the selected paths of voice data. This ensures that the selected paths of target voice data include voice segments, and the voice energies of the selected paths of target voice data are greater than voice energies of unselected paths of voice data.

A process of the server selecting the paths of voice data that include voice segments from the at least three paths of voice data is similar to the manner (1). Then, the server may sort the selected paths of voice data in descending order of the voice energies, and select the preset number of paths of voice data as the paths of target voice data based on the arrangement order.

For example, the preset number is 2. If a voice energy of a path of voice data transmitted by a first terminal A is greater than a voice energy of a path of voice data transmitted by a first terminal B, and the voice energy of the path of voice data transmitted by the first terminal B is greater than a voice energy of a path of voice data transmitted by a first terminal C, the path of voice data transmitted by the first terminal A and the path of voice data transmitted by the first terminal B may be selected as the paths of target voice data.

(3) The server obtains an arrangement order of the at least three paths of voice data according to the pieces of VAD information and the voice energies of the at least three paths of voice data. A path of voice data that includes a voice segment is ranked ahead of a path of voice data that does not include a voice segment. In addition, in the paths of voice data including voice segments, a path of voice data having a larger voice energy is ranked ahead of a path of voice data having a less voice energy. The server selects the preset number of paths of voice data that are ranked highest as the preset number of paths of target voice data, according to the arrangement order of at least three paths of voice data.

If the number of the paths of voice data including voice segments is not less than the preset number, the selected paths of target voice data are all paths including voice segments. If the number of the paths of voice data including voice segments is less than the preset number, the selected paths of target voice data include paths of voice data including voice segments and paths of voice data not including voice segments.

The embodiments of the present disclosure merely describe one second terminal and at least three first terminals corresponding to the second terminal as an example. However, in the same call group, each terminal may be used as the receiving terminal or the transmitting terminal. In order to facilitate the interaction of voice data and reduce calculation amount, at least four terminals in a call group transmit voice data to the server. Then, the server receives at least four paths of voice data, and obtains an arrangement order of the at least four paths of voice data according to the pieces of VAD information and the voice energies of the at least four paths of voice data. A path of voice data that includes a voice segment is ranked ahead of a path of voice data that does not include a voice segment. In addition, in the paths of voice data including voice segments, a path of voice data with a larger voice energy is ranked ahead of a path of voice data with a smaller voice energy.

Later, each time one of the terminals is determined as the second terminal, the server removes the path of voice data transmitted by the second terminal from the arrangement order of the obtained at least four paths of voice data, to obtain an arrangement order of remaining at least three paths of voice data.

This can ensure that for a call group, the server may only need to perform sorting once, without having to re-sort for a different second terminal, thereby reducing the calculation amount and enhancing the processing speed.

For example, after sorting the four paths of voice data, an obtained arrangement order is: the path of voice data transmitted by the terminal A, the path of voice data transmitted by the terminal B, the path of voice data transmitted by the terminal C, and the path of voice data transmitted by the terminal D. When or in response to determining that the terminal A is the receiving terminal, an arrangement order of the obtained other three paths of voice data is: the path of voice data transmitted by the terminal B, the path of voice data transmitted by the terminal C, and the path of voice data transmitted by the terminal D. If the preset number is 2, two paths of voice data ranked highest are selected; that is, the paths of voice data transmitted by the terminal B and by the terminal C are used as the paths of target voice data, and then transmitted to the terminal A. When or in response to determining that the terminal B is used as the receiving terminal, an arrangement order of the obtained other three paths of voice data are: the path of voice data transmitted by the terminal A, the path of voice data transmitted by the terminal C, and the path of voice data transmitted by the terminal D. In this implementation, two paths of voice data ranked highest are selected; that is, the paths of voice data transmitted by the terminal A and by the terminal C are used as the paths of target voice data, and then transmitted to the terminal B.

In certain embodiments, in order to assist in selecting the paths of target voice data and improve organization, the server may set a target voice data list and a candidate voice data list. The target voice data list is configured for storing selected paths of target voice data, and the candidate voice data list is configured for storing unselected paths of voice data.

First voice data in the at least three paths of voice data is used as an example. The server determines whether to add the first voice data to the target voice data list or to the candidate voice data list according to whether the first voice data includes a voice segment. The first voice data is any path of voice data among the at least three paths of voice data.

A process of processing the first voice data includes the following two situations:

In the first situation: the first voice data includes a voice segment.

Only the preset number of paths of target voice data can be stored in the target voice data list. Therefore, if the first voice data includes a voice segment, it may be desirable to determine whether a number of paths of voice data in the target voice data list has reached the preset number.

(1) If the first voice data in the at least three paths of voice data includes a voice segment, and the number of paths of voice data in the target voice data list has not reached the preset number, the server adds the first voice data to the target voice data list. This indicates that the first voice data is currently selected as a path of target voice data.

(2) If the first voice data includes a voice segment, and the number of paths of voice data in the target voice data list has reached the preset number, the server compares the voice energy of the first voice data with a voice energy of second voice data having a smallest voice energy in the target voice data list.

If the voice energy of the first voice data is greater than the voice energy of the second voice data, the server adds the first voice data to the target voice data list, and removes the second voice data from the target voice data list. This indicates that the first voice data is currently selected as a path of target voice data, while the second voice data is no longer used as a path of target voice data. The second voice data may be discarded or added to a candidate voice data list.

If the voice energy of the first voice data is less than the voice energy of the second voice data, the server keeps the paths of voice data in the target voice data list unchanged, and discards the first voice data or adds the first voice data to the candidate voice data list. This indicates that the first voice data is not currently selected as a path of target voice data, and the second voice data is still used as a path of target voice data.

The second voice data is any path of voice data among the at least three paths of voice data that is different from the first voice data.

In the second situation: the first voice data does not include a voice segment.

If the first voice data does not include a voice segment, the first voice data is added to the candidate voice data list. This indicates that the first voice data is not currently used as a path of target voice data.

There is no limit to a number of stored paths of voice data in the candidate voice data list.

In certain embodiments, the candidate voice data list includes a first candidate voice data list and a second candidate voice data list. The first candidate voice data list is configured for storing a path of voice data that does not include a voice segment and the corresponding first terminal is a designated terminal. The second candidate voice data list is configured for storing a path of voice data that does not include a voice segment and the corresponding first terminal is not a designated terminal. The designated terminal is a terminal whose previously transmitted path of voice data is selected as a path of target voice data.

Optionally, the first voice data carries the terminal identifier of the corresponding first terminal. The server obtains the terminal identifiers carried in the paths of target voice data in a previous call, and compares the terminal identifier carried in the first voice data with the terminal identifiers carried in the previous paths of target voice data. If the terminal identifiers carried in the previous paths of target voice data include the terminal identifier carried in the first voice data, the first terminal corresponding to the first voice data is determined as the designated terminal.

If the first voice data does not include a voice segment, the first voice data is added to the candidate voice data list, including:

(1) If the first voice data does not include a voice segment, and the first terminal corresponding to the first voice data is the designated terminal, the first voice data is added to the first candidate voice data list.

(2) If the first voice data does not include a voice segment, and the first terminal corresponding to the first voice data is not the designated terminal, the first voice data is added to the second candidate voice data list.

404. The server transmits the at least two paths of target voice data to the second terminal.

In certain embodiments, based on the optional solution of selecting at least two paths of target voice data in step 403, the server transmits the at least two paths of target voice data to the second terminal.

In certain embodiments, based on the optional solution of adding the first voice data to the target voice data list in step 403, the server transmits the paths of target voice data in the target voice data list to the second terminal.

405. The second terminal receives the at least two paths of target voice data transmitted by the server, decodes the at least two paths of target voice data, mixes decoded at least two paths of target voice data, and plays mixed voice data.

Figure 5:
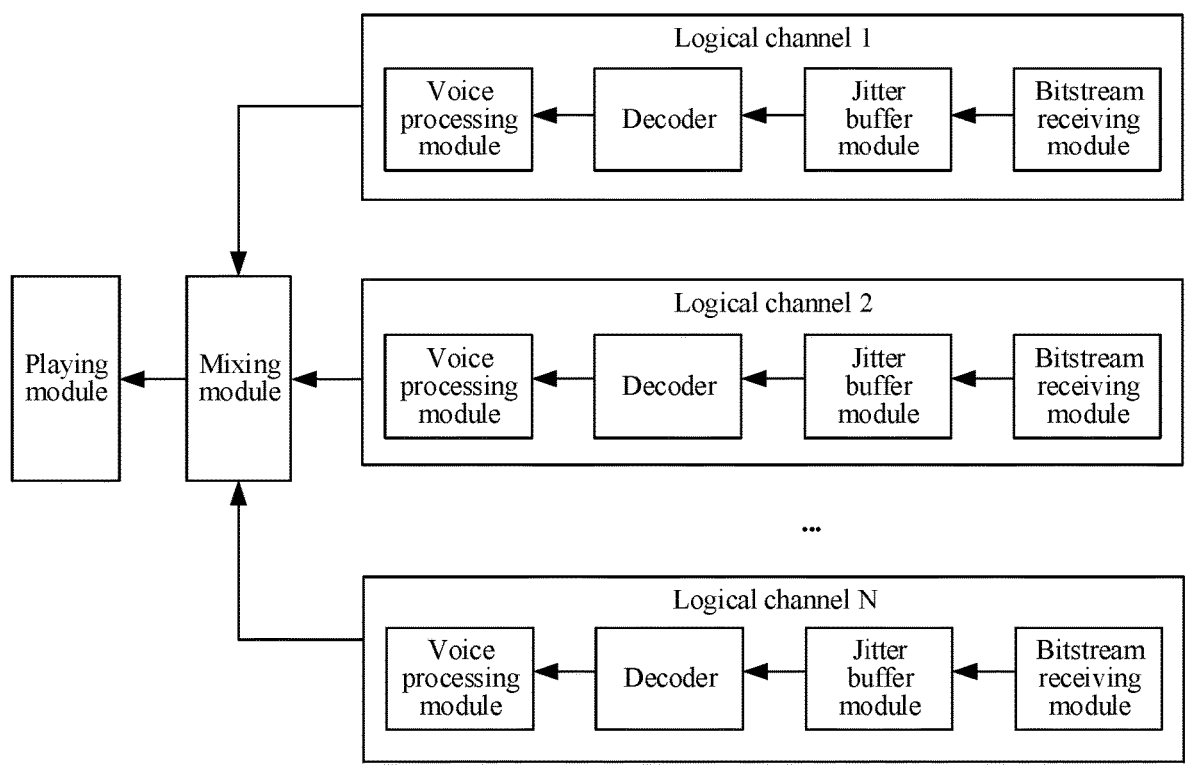
FIG. 5 is a schematic diagram of a receiving terminal processing voice data according to one or more embodiments of the present disclosure.

In certain embodiments, referring to FIG. 5, after receiving the at least two paths of target voice data, the second terminal creates a corresponding number of logical channels. Each logical channel includes a bitstream receiving module, a jitter buffer module, a decoder, and a voice processing module. The bitstream receiving module is configured to receive a path of target voice data. The jitter buffer module is configured to buffer and correct the path of target voice data. The decoder is configured to decode the path of target voice data, to obtain a decoded path of voice data. The voice processing module is configured to perform gain adjustment or timbre adjustment on the decoded path of voice data.

After each logical channel processes each path of target voice data, the obtained at least two paths of target voice data are mixed in a mixing module. The at least two paths of target voice data are combined into one path of voice data. A playing module plays the path of voice data.

The embodiments of the present disclosure merely use one server as an example. In another embodiment, since terminals may be distributed in different regions, a terminal may select a server that is closest to it or has a fastest speed when transmitting the voice data. Therefore, different terminals may be connected to different servers.

For example, the first server is connected to the second terminal, and the second server is connected to the first terminals. In addition, the first server may also be connected to the first terminals.

The second server receives at least three paths of voice data transmitted by at least three first terminals, and transmits the at least three paths of voice data to the first server. The first server receives the at least three paths of voice data transmitted by the second server, selects at least two paths of target voice data from the at least three paths of voice data, and transmits the at least two paths of target voice data to the second terminal. The second terminal decodes received at least two paths of target voice data, mixes decoded at least two paths of target voice data, and plays mixed voice data.

According to the method according to the embodiments of the present disclosure, the at least three first terminals transmit voice data to the server. The server obtains the voice data transmitted by the at least three first terminals, selects the at least two paths of target voice data from at least three paths of voice data according to the pieces of indication information of the obtained at least three paths of voice data, and transmits the at least two paths of target voice data to the second terminal. The second terminal receives the at least two paths of target voice data transmitted by the server, decodes the at least two paths of target voice data, mixes the decoded at least two paths of target voice data, and plays the mixed voice data. The method, by performing selection on the received at least three paths of voice data, and transmitting the selected paths of target voice data to the terminal, reduces transmission amount of the voice data. Therefore, during the transmitting process, the network bandwidth occupied is decreased, and the data traffic consumed is saved, which increases the transmission speed of the voice data, thereby improving the call quality.

In addition, in the embodiments of the present disclosure, the paths of voice data are mixed by the second terminal, which reduces computing resource occupied by the server, thereby reducing the resource consumption of the server, and improving the operating efficiency of the server.

In addition, the embodiments of the present disclosure adopt distributed processing. The first terminals process the paths of voice data, to obtain the pieces of VAD information and the voice energies. The server performs routing processing on the paths of voice data, to obtain the paths of target voice data. The second terminal decodes and mixes the paths of voice data. The distributed processing performed on the paths of voice data by the first terminals, the server, and the second terminal reduces the occupations of computing resources and network bandwidth.

In addition, the paths of voice data may be mixed in the server. The server decodes and mixes the received at least three paths of voice data, and then transmits the mixed voice data to the second terminal as one path of voice data. The second terminal may only need to play the received path of voice data. This method requires the server to process the paths of voice data, which occupies more computing resource of the server.

In the embodiments of the present disclosure, the server may only need to select the paths of voice data, without having to decode the paths of voice data, so as to reduce the computing resource occupied by the server, thereby reducing the resource consumed by the server. The number of paths of voice data transmitted from the server to the second terminal is reduced, which reduces the occupied network bandwidth, and reduces the requirement for the network bandwidth, thereby increasing the transmission speed, and improving the call quality. Moreover, noise in the voice data can be filtered out by selecting the paths of voice data.

Based on the embodiments, in certain embodiments, the server creates a corresponding control program for the second terminal. The server runs the control program to select the at least two paths of target voice data from the at least three paths of voice data, according to the pieces of indication information of the at least three paths of voice data. The control program is configured for selecting the paths of target voice data transmitted to the second terminal.

The server may be connected to a plurality of terminals. The plurality of terminals may be located in the same call group or in different call groups.

Figure 6:
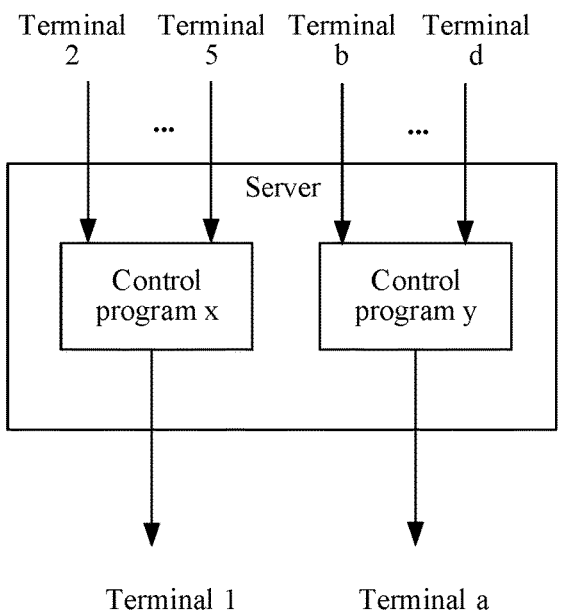
FIG. 6 is a schematic diagram of a control program according to one or more embodiments of the present disclosure.

For example, referring to FIG. 6, a terminal 1, a terminal 2, a terminal 3, a terminal 4, and a terminal 5 are in the same call group. The server creates a control program x for the terminal 1. The control program x selects the target voice data from the voice data of the terminal 2, the terminal 3, the terminal 4, and the terminal 5, and transmits the target voice data to the terminal 1. A terminal a, a terminal b, a terminal c, a terminal d, and a terminal e are in the same call group. The server creates a control program y for the terminal a. The control program y selects the target voice data from the voice data of the terminal b, the terminal c, the terminal d, and the terminal e, and transmits the target voice data to the terminal a.

In addition, based on the embodiments, the server is provided with a routing logical module. The routing logical module includes a parsing unit, a routing algorithm unit, and a routing switch unit. The parsing unit is configured to parse a path of voice data, to obtain a piece of VAD information and a voice energy. The routing algorithm unit is configured to select a preset number of paths of target voice data from at least three paths of voice data. The routing switch unit is configured to transmit the selected paths of target voice data to the second terminal.

Figure 7:
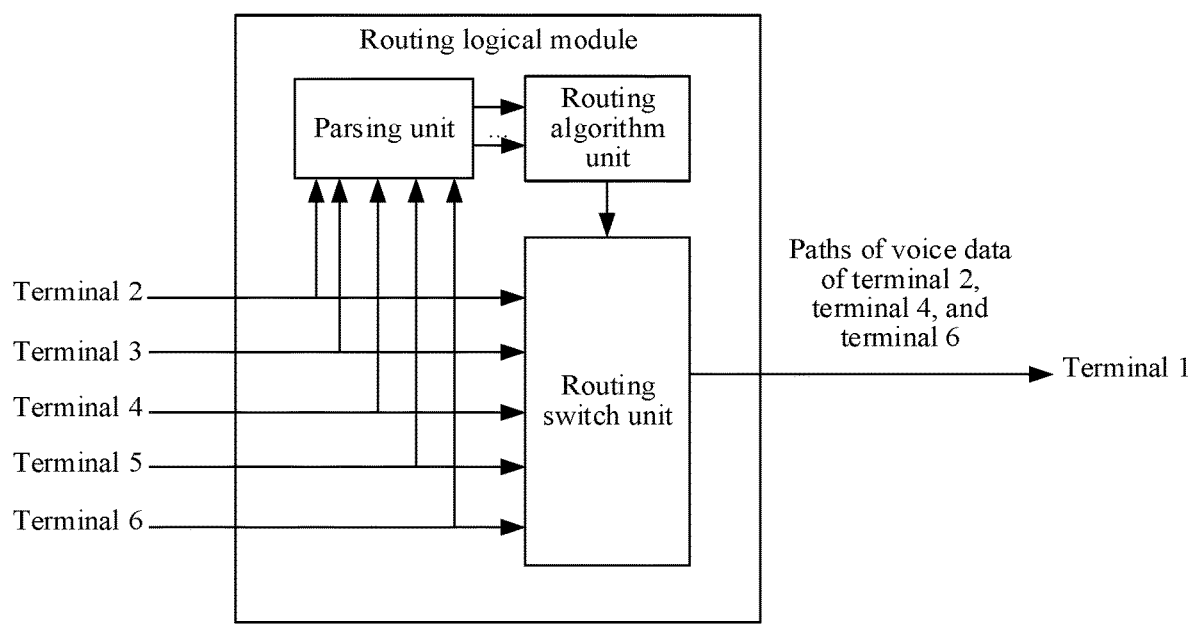
FIG. 7 is a schematic diagram of a routing logical module according to one or more embodiments of the present disclosure.

For example, referring to FIG. 7, the preset number is 3; a terminal 1 is used as the second terminal, a terminal 2, a terminal 3, a terminal 4, a terminal 5, and a terminal 6 are used as the first terminals. After the first terminals transmit paths of voice data to the server, the server uses the routing logical module to select paths of target voice data from the paths of voice data transmitted by the five first terminals.

A transmitted path of voice data carries a data type, a piece of VAD information, a voice energy, a piece of payload data, and so on. The parsing unit parses each path of voice data, to obtain the piece of VAD information and the voice energy of each path of voice data. The routing algorithm unit may select the paths of voice data of the terminal 2, the terminal 4 and the terminal 6 from the paths of voice data of the terminal 2, the terminal 3, the terminal 4, the terminal 5 and the terminal 6, based on any implementation of selecting the target voice data in the embodiments of the present disclosure. The routing switch unit transmits the three paths of voice data to the terminal 1.

Figure 8:
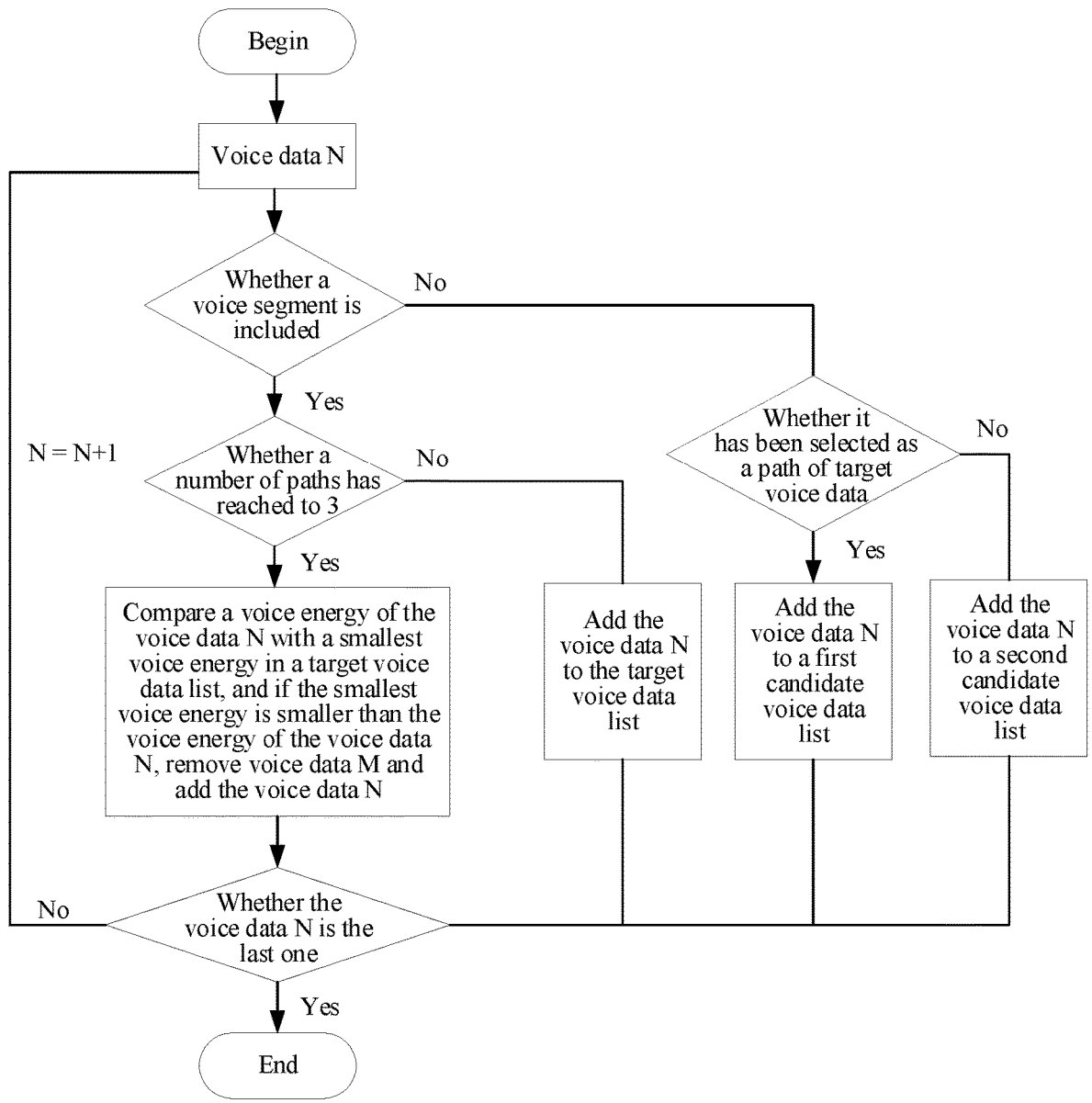
FIG. 8 is a schematic flowchart of a target voice data selection method according to one or more embodiments of the present disclosure.

A routing algorithm flowchart of a routing algorithm unit refers to FIG. 8. The paths of voice data of the terminals 1 to 6 are selected by using the routing algorithm respectively. Finally, the paths of voice data are added to a target voice data list, a first candidate data list or a second candidate voice data list.

The paths of voice data are traversed. A path of voice data N is selected through the following steps:

(1) Determine whether the path of voice data N includes a voice segment. If the path of voice data N includes a voice segment, step (2) is performed. If the path of voice data N does not include a voice segment, step (5) is performed.

(2) Determine whether a number of paths of voice data in the target voice data list has reached 3. If the number of the paths of voice data in the target voice data list has reached 3, step (3) is performed. If the number of the paths of voice data in the target voice data list has not reached 3, step (4) is performed.

(3) Compare a voice energy of the path of voice data N with a smallest voice energy in the target voice data list. If the voice energy of the path of voice data N is greater than the smallest voice energy in the target voice data list, a path of voice data M corresponding to the smallest voice energy is removed from the target data list, the path of voice data N is added to the target voice data list, and step (8) is performed.

(4) Add the path of voice data N to the target voice data list, and step (8) is performed.

(5) Determine whether the path of voice data N was previously selected as a path of target voice data. If the path of voice data N was previously selected as the path of target voice data, step (6) is performed. If the path of voice data N was not previously selected as the path of target voice data, step (7) is performed.

(6) Add the path of voice data N to the first candidate voice data list, and step (8) is performed.

(7) Add the path of voice data N to the second candidate voice data list, and step (8) is performed.

(8) Determine whether the path of voice data N is the last one of the six paths of voice data. If the path of voice data N is the last one, the process is over, and the paths of voice data in the target voice data list are finally selected paths of target voice data. If the path of voice data N is not the last one, step (1) is performed, and a path of voice data N+1 is selected.

Figure 9:
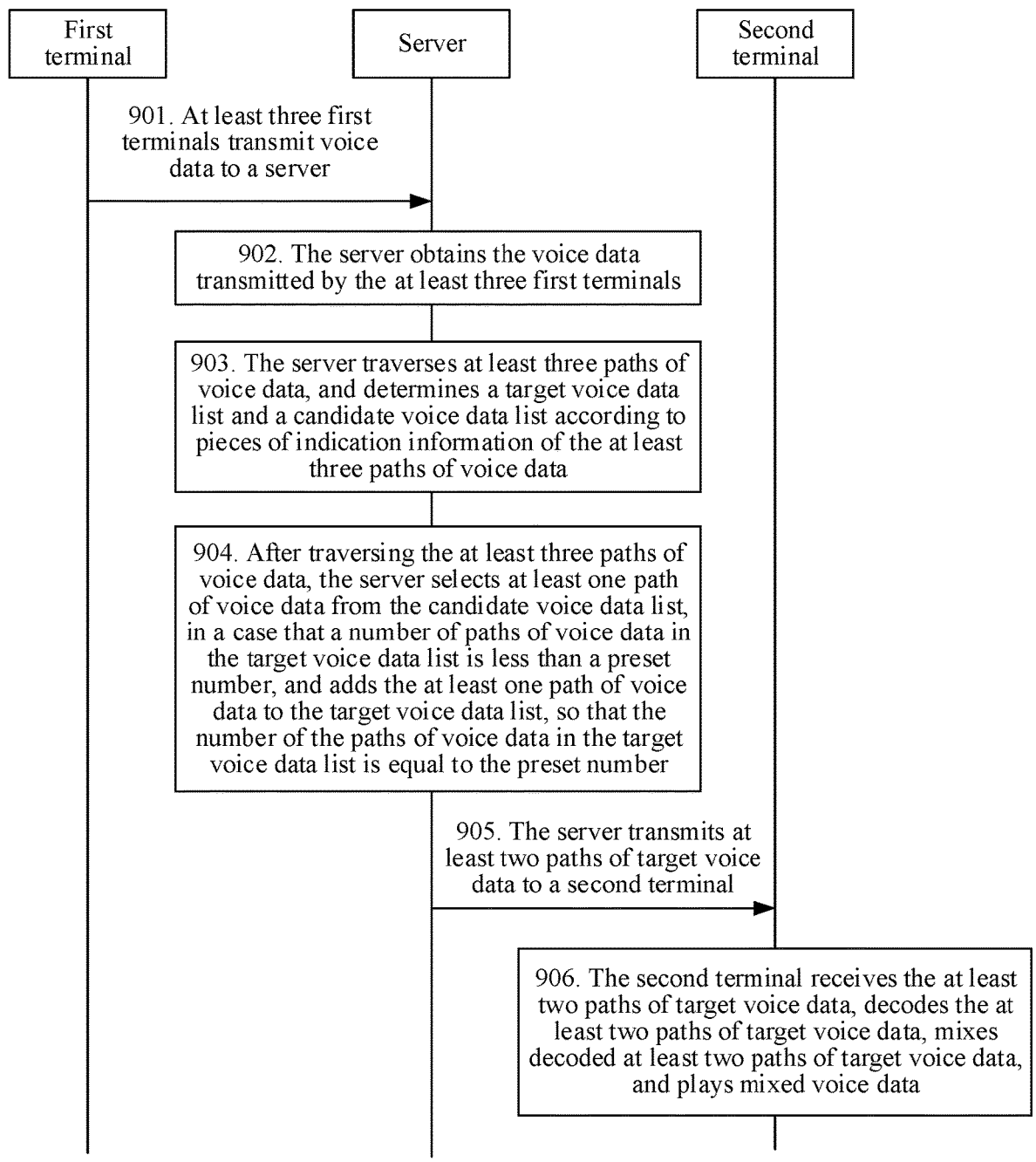
FIG. 9 is a schematic flowchart of another call method according to one or more embodiments of the present disclosure.

FIG. 9 is a flowchart of another call method according to an embodiment of the present disclosure. In the embodiments of the present disclosure, interaction subjects are first terminals, a server, and a second terminal. Referring to FIG. 9, the method includes:

901. At least three first terminals transmit voice data to the server.

902. The server obtains the voice data transmitted by the at least three first terminals.

The implementations are similar to those described in step 401 and step 402 of the embodiment.

903. The server traverses at least three paths of voice data, and determines a target voice data list and a candidate voice data list according to pieces of indication information of the at least three paths of voice data.

The server adds each path of voice data to the target voice data list or the candidate voice data list respectively, according to the piece of indication information of each path of voice data, so that the target voice data list and the candidate voice data list are determined. The target voice data list is configured for storing a currently selected path of voice data, and the candidate voice data list is configured for storing a currently unselected path of voice data.

The implementation according to which the server adds each path of voice data to the target voice data list or the candidate voice data list is similar to the implementation according to which the first voice data is added to the target voice data list or the candidate voice data list in the embodiments.

In certain embodiments, the candidate voice data list includes a first candidate voice data list and a second candidate voice data list. The first candidate voice data list is configured for storing a path of voice data that does not include a voice segment and the corresponding first terminal is a designated terminal. The second candidate voice data list is configured for storing a path of voice data that does not include a voice segment and the corresponding first terminal is not a designated terminal. The designated terminal is a terminal whose previously transmitted path of voice data is selected as a path of target voice data. The implementation according to which the server adds a path of voice data to the first candidate voice data list or the second candidate voice data list is similar to the implementation in step 403 of the embodiment.

904. After traversing the at least three paths of voice data, the server selects at least one path of voice data from the candidate voice data list, when or in response to determining that a number of paths of voice data in the target voice data list is less than a preset number, and adds the at least one path of voice data to the target voice data list, so that the number of the paths of voice data in the target voice data list is equal to the preset number.

The server may traverse the at least three paths of voice data, and perform the above step 903 for each path of voice data, so as to add each path of voice data to the target voice data list or the candidate voice data list. After traversing the at least three paths of voice data, a preliminary selection of the target voice data can be performed.

In the embodiments of the present disclosure, the target voice data list and the candidate voice data list are provided to store the paths of voice data. The selected paths of voice data are added to the target voice data list, and the unselected paths of voice data are added to the candidate voice data list, which is more organized. In addition, the server may directly obtain the target voice data from the target voice data list when transmitting the target voice data to the second terminal, which is more convenient for transmitting the target voice data.

In addition, considering that after the preliminary selection, the number of the paths of voice data in the target voice data list may not reach the preset number, the selection for the target voice data may be continued. Therefore, in an embodiment of the present disclosure, if the number of the paths of voice data in the target voice data list has not reached the preset number, a path of voice data may be selected from the candidate voice data list and then added to the target voice data list, so that the number of the paths of voice data in the target voice data list is equal to the preset number. In this way, not only the paths of voice data that include voice segments can be selected first, but also if the number of the paths of voice data is insufficient, the paths of voice data that do not include voice segments can be supplemented, which improves flexibility, thus having a wider range of implementations.

Based on an optional manner of adding the paths of voice data to the first candidate voice data list or the second candidate voice data list in the embodiment, when or in response to determining that the number of the paths of voice data in the target voice data list is less than the preset number, the server may select at least one path of voice data from the first candidate voice data list or the second candidate voice data list, and add the at least one path of voice data to the target voice data list, so that the number of paths of voice data in the target voice data list is equal to the preset number.

In certain embodiments, if the number of the paths of voice data in the target voice data list is less than the preset number, the server selects at least one path of voice data from the first candidate voice data list, and adds the at least one path of voice data to the target voice data list, so that the number of the paths of voice data in the target voice data list is equal to the preset number.

The first candidate voice data list includes a sufficient number of paths of candidate voice data, so that the server may only need to select at least one path of voice data from the first candidate voice data list, and add the at least one path of voice data to the target voice data list, so that the number of paths of voice data in the target voice data list is equal to the preset number.

Assuming that the number of the paths of voice data in the target voice data list differs from the preset number by N, any N paths of voice data may be selected from the first candidate voice data list. The selected N paths of voice data are added to the target voice data list. Alternatively, according to numbers of times that the designated terminals corresponding to the paths of voice data in the first candidate voice data list have been selected previously, N paths of voice data with largest number of times are selected and added to the target voice data list. Alternatively, N paths of voice data may be selected from the first candidate voice data list and added to the target voice data list in other manners.

In certain embodiments, if the number of the paths of voice data in the target voice data list is less than the preset number, the server adds all the paths of voice data in the first candidate voice data list to the target voice data list. After this, the number of the paths of voice data in the target voice data list is not greater than the preset number, the server selects at least one path of voice data from the second candidate voice data list, and adds the at least one path of voice data to the target voice data list, so that the number of paths of voice data in the target voice data list is equal to the preset number.

Assuming that after adding all the paths of voice data in the first candidate voice data list to the target voice data list, the number of the paths of voice data in the target voice data list is different from the preset number by M. M paths of voice data may be selected arbitrarily or in other ways from the second candidate voice data list. The selected M paths of voice data may be added to the target voice data list.

In addition, when selecting the paths of target voice data, the paths of target voice data are only selected according to the currently transmitted paths of voice data. In a call group, speaking is generally continuous. Thus, for a current moment, when or in response to determining that a person was speaking at a previous moment, even if the person is not speaking at the current moment, the probability of the person speaking at a next moment is relatively large. When or in response to determining that the person was not speaking before, and is not speaking at the current moment, the probability of the person speaking at the next moment is relatively small.

In the embodiments of the present disclosure, a path of voice data in the first candidate voice data list is transmitted by a terminal whose previously transmitted path of voice data is selected as a path of target voice data, namely a path of voice data transmitted by a user who was speaking before. A path of voice data in the second candidate voice data list is transmitted by a terminal whose previously transmitted path of voice data is not selected as a path of target voice data, namely a path of voice data transmitted by a user who was not speaking before.

According to the previous call situation, the path of voice data that the user who was speaking before and the path of voice data that the user who was not speaking before are added to different candidate voice data lists. The paths of voice data in the first candidate voice data list are added to the target voice data list, and when or in response to determining that the number is insufficient, the paths of voice data in the second candidate voice data list are then added to the target voice data list. By using this manner, the selection of the voice data can be more organized. In addition, taking account of the actual situation of the voice call can ensure that the selected paths of target voice data are more accurate, thereby better satisfying user requirements.

After the server performs traversing the at least three paths of voice data, if the number of the paths of voice data in the target voice data list is equal to the preset number, the target voice data list has been determined, and there may not be a need to perform step 904.

905. The server transmits the at least two paths of target voice data to the second terminal.

906. The second terminal receives the at least two paths of target voice data, decodes the at least two paths of target voice data, mixes decoded at least two paths of target voice data, and plays mixed voice data.

The server transmits the preset number of paths of target voice data in the target voice data list to the second terminal. The second terminal receives the preset number of paths of target voice data, decodes the preset number of paths of target voice data, mixes the decoded preset number of paths of target voice data, and plays the processed voice data.

The implementation according to which the paths of target voice data are processed is similar to the implementation in step 405 of the embodiment.

In the method according to the embodiments of the present disclosure, at least three first terminals transmit voice data to the server. The server obtains the voice data transmitted by the at least three first terminals. The server traverses at least three paths of voice data, and determines the target voice data list and the candidate voice data list according to the pieces of indication information of the at least three paths of voice data. After traversing the at least three paths of voice data, if the number of paths of voice data in the target voice data list is less than the preset number, the server selects at least one path of voice data from the candidate voice data list, and add the at least one path of voice data to the target voice data list, so that the number of paths of voice data in the target voice data list is equal to the preset number. The server transmits at least two paths of target voice data to the second terminal. The second terminal receives the at least two paths of target voice data transmitted by the server, decodes the at least two paths of target voice data, mixes the decoded at least two paths of target voice data, and plays the mixed voice data. In this method, the server determines the target voice data list and the candidate voice data list, and makes the number of paths of voice data in the target voice data list to reach the preset number, so as to transmit the preset number of paths of target voice data to the second terminal, which reduces the transmission amount of the voice data, thereby reducing the occupied network bandwidth. Requiring less traffic helps enhancing the transmission speed of the voice data and improving the quality of voice data.

Figure 10:
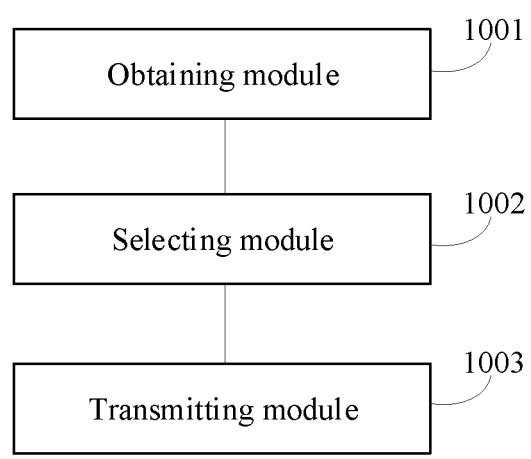
FIG. 10 is a schematic structural diagram of a call apparatus according to one or more embodiments of the present disclosure.

FIG. 10 is a schematic structural diagram of a call apparatus according to an embodiment of the present disclosure. Referring to FIG. 10, the call apparatus includes: an obtaining module 1001, a selecting module 1002, and a transmitting module 1003. The modules in the call apparatus may be implemented in whole or in part through software, hardware, or a combination thereof.

The obtaining module 1001 is configured to obtain paths of voice data transmitted by at least three first terminals. The paths of voice data each carries a piece of indication information, the piece of indication information includes at least a piece of VAD information, and the piece of VAD information is configured for indicating whether the corresponding path of voice data includes a voice segment.

The selecting module 1002 is configured to select at least two paths of target voice data from the at least three paths of voice data according to the pieces of indication information of the obtained at least three paths of voice data. A number of paths of the at least two paths of target voice data is less than a number of paths of the at least three paths of voice data.

The transmitting module 1003 is configured to transmit the at least two paths of target voice data to a second terminal. The second terminal is configured to decode the at least two paths of target voice data, mix decoded at least two paths of target voice data, and play mixed voice data.

The second terminal is any terminal in a call group, and the at least three first terminals are terminals in the call group that are different from the second terminal.

Figure 11:
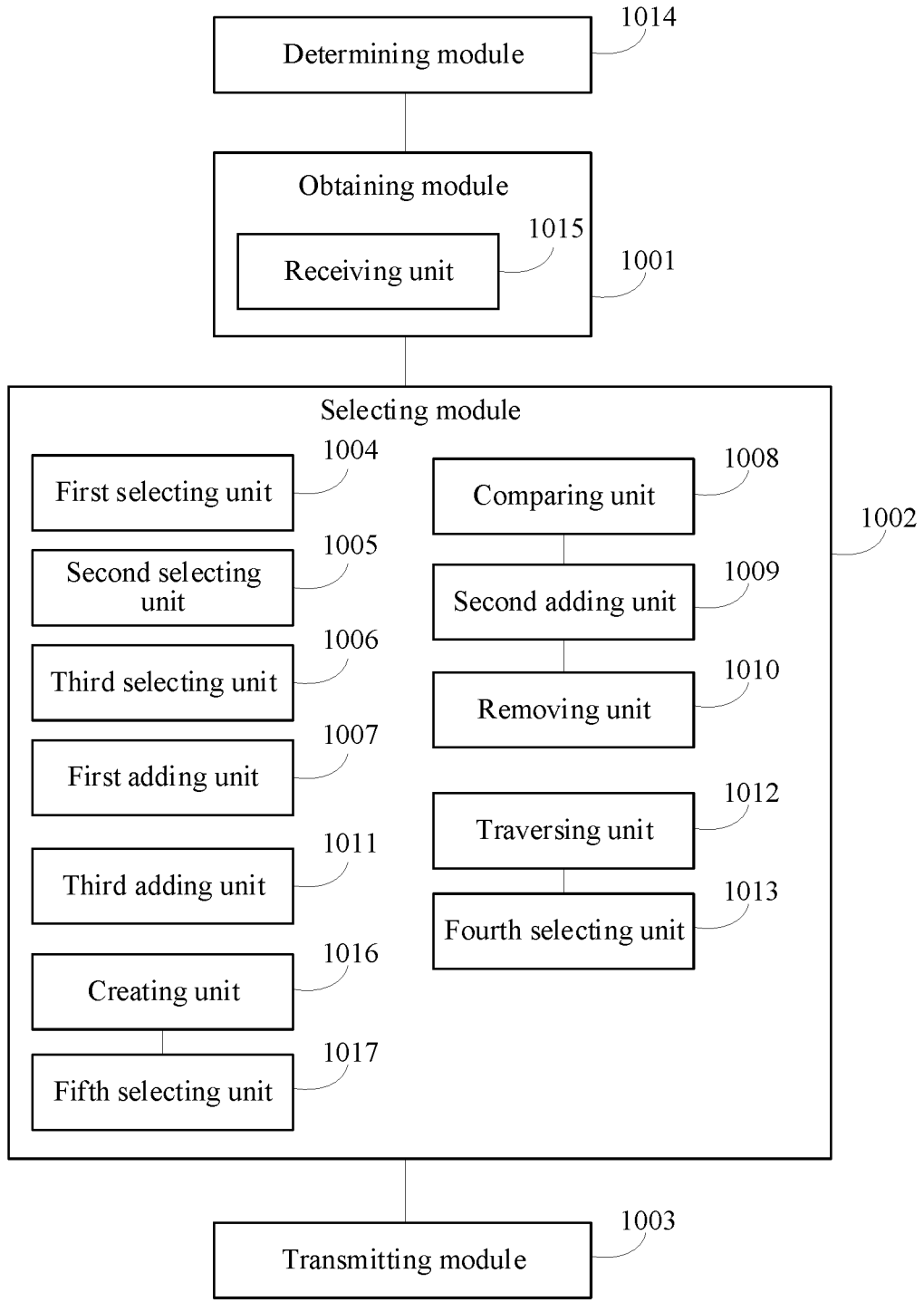
FIG. 11 is a schematic structural diagram of another call apparatus according to one or more embodiments of the present disclosure.

In an embodiment, referring to FIG. 11, the selecting module 1002 includes: a first selecting unit 1004, configured to select at least two paths of target voice data that includes voice segments from the at least three paths of voice data, according to the pieces of VAD information of the obtained at least three paths of voice data.

In an embodiment, the piece of indication further includes a voice energy. Referring to FIG. 11, the selecting module 1002 includes: a second selecting unit 1005, configured to select a preset number of paths of voice data that include voice segments and have largest voice energies from the at least three paths of voice data as a preset number of paths of target voice data, according to the pieces of VAD information and the voices energies of the obtained at least three paths of voice data, the preset number being less than a number of paths of the at least three paths of voice data.

In an embodiment, the piece of indication further includes a voice energy. Referring to FIG. 11, the selecting module 1002 includes: a third selecting unit 1006, configured to obtain an arrangement order of the at least three paths of voice data according to the pieces of VAD information and the voice energies of the obtained at least three paths of voice data, a path of voice data that includes a voice segment being ranked ahead of a path of voice data that does not include a voice segment, and in the paths of voice data that include voice segments, a path of voice data with a larger voice energy being ranked ahead of a path of voice data with a smaller voice energy.

The third selecting unit 1006 is further configured to select a preset number of paths of voice data that are ranked highest according to the arrangement order of the at least three paths of voice data as a preset number of paths of target voice data, the preset number being less than a number of paths of the at least three paths of voice data.

In an embodiment, referring to FIG. 11, the selecting module 1002 includes: a first adding unit 1007, configured to add first voice data to a target voice data list, when or in response to determining that the first voice data in the at least three paths of voice data includes a voice segment, and a number of paths of voice data in the target voice data list has not reached a preset number. The target voice data list is configured for storing a selected path of target voice data, and the preset number is less than a number of paths of the at least three paths of voice data.

In an embodiment, referring to FIG. 11, the selecting module 1002 further includes: a comparing unit 1008, configured to compare the voice energy of the first voice data with the voice energy of second voice data that has a smallest voice energy in the target voice data list, when or in response to determining that the first voice data includes a voice segment, and the number of the paths of voice data in the target voice data list has reached the preset number; a second adding unit 1009, configured to add the first voice data to the target voice data list, when or in response to determining that the voice energy of the first voice data is greater than the voice energy of the second voice data; and a removing unit 1010, configured to remove the second voice data from the target voice data list.

In an embodiment, referring to FIG. 11, the selecting module 1002 further includes: a third adding unit 1011, configured to add the first voice data to a candidate voice data list, when or in response to determining that the first voice data does not include a voice segment.

In an embodiment, the candidate voice data list includes a first candidate voice data list. The third adding unit 1011 is further configured to add the first voice data to the first candidate voice data list, when or in response to determining that the first voice data does not include a voice segment, and the first terminal corresponding to the first voice data is a designated terminal. The designated terminal is a terminal whose previously transmitted path of voice data is selected as a path of target voice data.

In an embodiment, the candidate voice data list includes a second candidate voice data list. The third adding unit 1011 is further configured to add the first voice data to the second candidate voice data list, when or in response to determining that the first voice data does not include a voice segment, and the first terminal corresponding to the first voice data is not a designated terminal. The designated terminal is a terminal whose previously transmitted path of voice data is selected as a path of target voice data.

In an embodiment, referring to FIG. 11, the selecting module 1002 includes: a traversing unit 1012, configured to traverse the obtained at least three paths of voice data, and determine a target voice data list and a candidate voice data list according to the pieces of indication information of the at least three paths of voice data. The target voice data list is configured for storing a currently selected path of voice data, and the candidate voice data list is configured for storing a currently unselected path of voice data; and a fourth selecting unit 1013, configured to select, after traversing the at least three paths of voice data, at least one path of voice data from the candidate voice data list, when or in response to determining that a number of paths of voice data in the target voice data list is less than a preset number, and add the one path of voice data to the target voice data list, so that the number of the paths of voice data in the target voice data list is equal to the preset number. The preset number is less than a number of paths of the at least three paths of voice data.

In an embodiment, the candidate voice data list includes a first candidate voice data list and a second candidate voice data list. The first candidate voice data list is configured for storing a path of voice data that does not include a voice segment and the corresponding first terminal is a designated terminal. The second candidate voice data list is configured for storing a path of voice data that does not include a voice segment and the corresponding first terminal is not a designated terminal. The designated terminal is a terminal whose previously transmitted path of voice data is selected as a path of target voice data.

In an embodiment, the fourth selecting unit 1013 is further configured to select at least one path of voice data from the first candidate voice data list, when or in response to determining that the number of the paths of voice data in the target voice data list is less than the preset number, and add the at least one path of voice data to the target voice data list, so that the number of the paths of voice data in the target voice data list is equal to the preset number.

In an embodiment, the fourth selecting unit 1013 is further configured to: add all of paths of voice data in the first candidate voice data list to the target voice data list, when or in response to determining that the number of the paths of voice data in the target voice data list is less than the preset number, the number of paths of voice data in the target voice data list after adding the paths of voice data being not greater than the preset number; and select at least one path of voice data from the second candidate voice data list, and add the at least one path of voice data to the target voice data list, so that the number of the paths of voice data in the target voice data list is equal to the preset number.

In an embodiment, the piece of VAD information of the path of voice data includes a VAD identifier of each voice frame in the path of voice data. The call apparatus further includes: a determining module 1014, configured to determine that the path of voice data includes a voice segment when or in response to determining that the piece of VAD information of the path of voice data includes the first VAD identifier.

The determining module 1014 is further configured to determine that the path of voice data does not include a voice segment when or in response to determining that the piece of VAD information of the path of voice data does not include the first VAD identifier.

The first VAD identifier is configured for indicating that the corresponding voice frame is a voice segment.

In an embodiment, the call apparatus is applied to a first server. The first server is a server connected to the second terminal. Referring to FIG. 11, the obtaining module 1001 includes:

A receiving unit 1015 is configured to receive voice data transmitted by the second server. The voice data is transmitted from the first terminals to the second server. The second server is a server connected to the first terminals.

In an embodiment, referring to FIG. 11, the selecting module 1002 includes: a creating unit 1016, configured to create a corresponding control program for the second terminal; and a fifth selecting unit 1017, configured to select the at least two paths of target voice data from the at least three paths of voice data according to the pieces of indication information of the at least three paths of voice data by running the control program.

When making a call through the call apparatus according to the embodiments, the functional modules are merely used as an example. In practical implementations, the functions may be implemented by different functional modules as desirable. That is, an internal structure of the server is divided into different functional modules, to perform all or part of the functions. In addition, the call apparatus according to the embodiments and the call method embodiments belong to the same concept, and a specific implementation process refers to the method embodiments.

Figure 12:
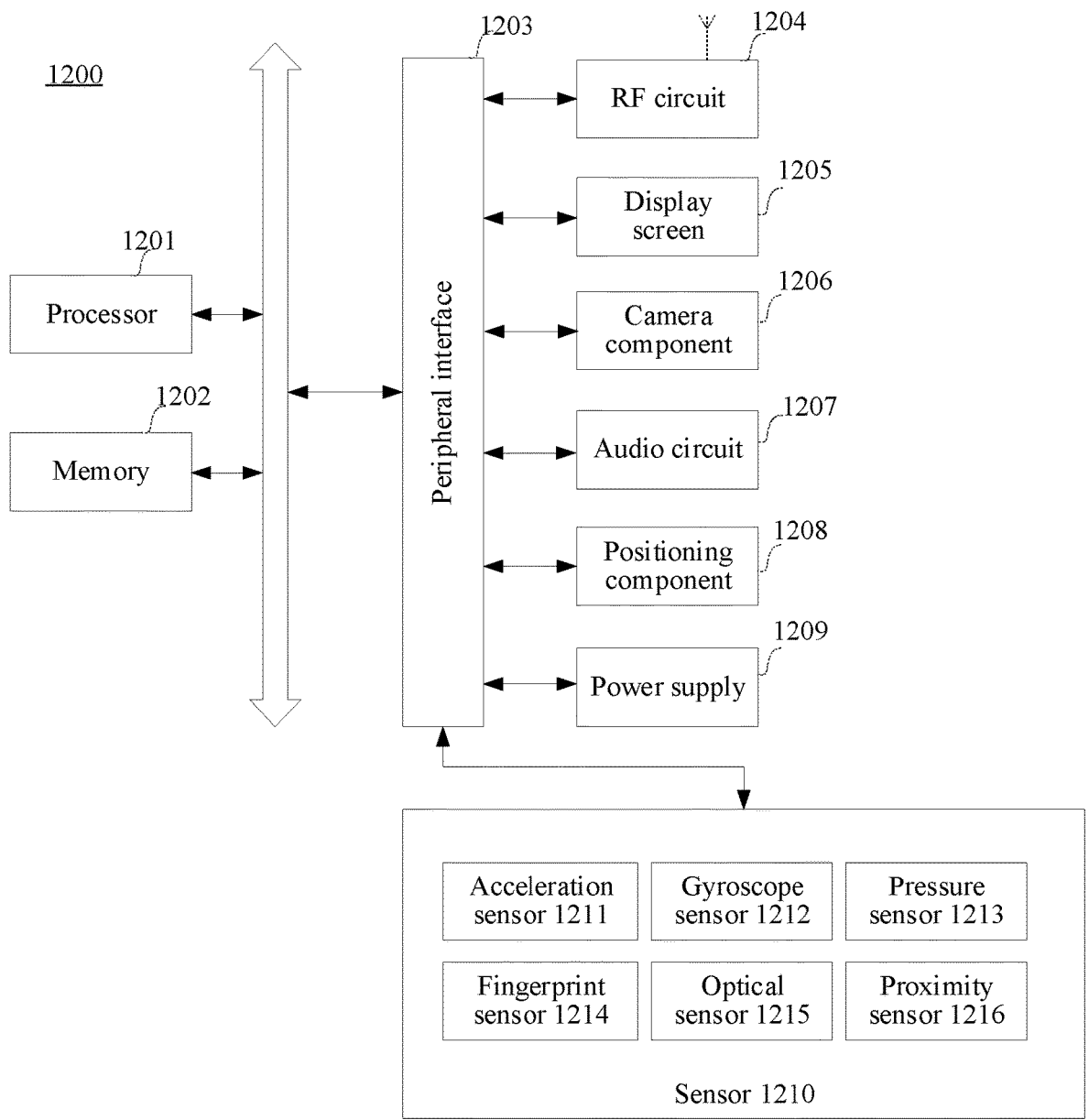
FIG. 12 is a schematic structural diagram of a terminal according to one or more embodiments of the present disclosure.

FIG. 12 is a schematic structural diagram of a terminal 1200 according to an exemplary embodiment of the present disclosure.

Generally, the terminal 1200 includes a processor 1201 and a memory 1202.

The processor 1201 may include one or more processing cores. For example, the processor 1201 may be a 4-core processor or an 8-core processor. The processor 1201 may be implemented by using at least one hardware form of a digital signal processor (DSP), a field programmable gate array (FPGA), and a programmable logic array (PLA). The processor 1201 may further include a main processor and a coprocessor. The main processor is a processor configured to process data in an awake state, and is also referred to as a central processing unit (CPU). The coprocessor is a low power consumption processor configured to process the data in a standby state. In some embodiments, the processor 1201 may be integrated with a graphics processing unit (GPU). The GPU is configured to render and draw content that may need to be displayed on a display screen. In some embodiments, the processor 1201 may further include an AI processor. The AI processor is configured to process computing operations related to ML.

The memory 1202 may include one or more computer-readable storage media that may be non-transitory. The memory 1202 may further include a high-speed random access memory and a non-volatile memory, such as one or more magnetic disk storage devices or flash storage devices. In some embodiments, the non-transitory computer-readable storage medium in the memory 1202 is configured to store at least one program code. The at least one program code, when executed by the processor 1201, is configured for implementing the call method according to the method embodiments of the present disclosure.

In some embodiments, the device 1200 may optionally include: a peripheral interface 1203 and at least one peripheral. The processor 1201, the memory 1202, and the peripheral interface 1203 may be connected by using a bus or a signal cable. Each peripheral may be connected to the peripheral interface 1203 by using a bus, a signal cable, or a circuit board. The peripheral device includes at least one of a radio frequency (RF) circuit 1204, a display screen 1205, a camera component 1206, an audio circuit 1207, a positioning component 1208, and a power supply 1209.

The peripheral interface 1203 may be configured to connect the at least one peripheral related to input/output (I/O) to the processor 1201 and the memory 1202. In some embodiments, the processor 1201, the memory 1202, and the peripheral interface 1203 are integrated on the same chip or circuit board. In some other embodiments, any one or two of the processors 1201, the memory 1202, and the peripheral interface 1203 may be implemented on an independent chip or circuit board. This is not limited in this embodiment.

The RF circuit 1204 is configured to receive and transmit an RF signal, also referred to as an electromagnetic signal. The RF circuit 1204 communicates with a communication network and another communication device by using the electromagnetic signal. The RF circuit 1204 converts an electrical signal into an electromagnetic signal for transmission, or converts a received electromagnetic signal into an electrical signal. Optionally, the RF circuit 1204 includes: an antenna system, an RF transceiver, one or more amplifiers, a tuner, an oscillator, a digital signal processor, a codec chip set, a subscriber identity module card, and the like. The RF circuit 1204 may communicate with other devices through at least one wireless communication protocol. The wireless communication protocol includes, but is not limited to, a metropolitan area network, generations of mobile communication networks (2G, 3G, 4G, and 5G), a wireless local area network, and/or a Wireless Fidelity (Wi-Fi) network. In some embodiments, the RF 1204 may further include a circuit related to NFC, which is not limited in the present disclosure.

The display screen 1205 is configured to display a UI. The UI may include a graph, text, an icon, a video, and any combination thereof. When the display screen 1205 is the touch display screen, the display screen 1205 also has the capability to collect a touch signal on or above a surface of the display screen 1205. The touch signal may be inputted into the processor 1201 as a control signal for processing. In this implementation, the display screen 1205 may be further configured to provide a virtual button and/or a virtual keyboard, also referred to as a soft button and/or a soft keyboard. In some embodiments, there may be one display screen 1205, which is provided on a front panel of the terminal 1200. In some other embodiments, there may be at least two display screens 1205, which are respectively provided on different surfaces of the terminal 1200, or have a folding design. In some other embodiments, the display screen 1205 may be a flexible display screen, which is provided on a curved surface or a folding surface of the terminal 1200. Even, the display screen 1205 may be further set to have a non-rectangular irregular graph, that is, a special-shaped screen. The display screen 1205 may be manufactured by using a material such as a liquid crystal display (LCD), an organic light-emitting diode (OLED), or the like.

The camera component 1206 is configured to capture an image or a video. Optionally, the camera assembly 1206 includes a front-facing camera and a rear-facing camera. Generally, a front camera is provided on the front panel of the terminal 1200, and a rear camera is provided on a back of the terminal 1200. In some embodiments, there are at least two rear cameras, which are respectively any of a main camera, a depth-of-field camera, a wide-angle camera, and a telephoto camera, to implement background blur through fusion of the main camera and the depth-of-field camera, panoramic photographing and virtual reality (VR) photographing through fusion of the main camera and the wide-angle camera, or other fusion photographing functions. In some embodiments, the camera component 1206 may further include a flash. The flash may be a single color temperature flash or a double color temperature flash. The double color temperature flash refers to a combination of a warm light flash and a cold light flash, and may be used for light compensation under different color temperatures.

The audio circuit 1207 may include a microphone and a speaker. The microphone is configured to acquire sound waves of users and surroundings, and convert the sound waves into electrical signals and input the signals to the processor 1201 for processing, or input the signals to the RF circuit 1204 to implement voice communication. For the purpose of stereo acquisition or noise reduction, there may be a plurality of microphones, respectively disposed at different portions of the terminal 1200. The microphone may further be an array microphone or an omni-directional acquisition type microphone. The speaker is configured to convert electric signals from the processor 1201 or the RF circuit 1204 into sound waves. The speaker may be any suitable thin-film speaker or a piezoelectric ceramic speaker. When the speaker is the piezoelectric ceramic speaker, the speaker can not only convert an electrical signal into sound waves audible to a human being, but also convert an electrical signal into sound waves inaudible to the human being for ranging and other purposes. In some embodiments, the audio circuit 1207 may further include an earphone jack.

The positioning component 1208 is configured to position a current geographic location of the terminal 1200 for implementing navigation or a location-based service (LBS). The positioning component 1208 may be a positioning component based on the global positioning system (GPS) of the United States, the COMPASS System of China, the GLONASS System of Russia, or the GALILEO System of the European Union.

The power supply 1209 is configured to supply power to components in the terminal 1200. The power supply 1209 may be an alternating current, a direct current, a primary battery, or a rechargeable battery. When the power supply 1209 includes the rechargeable battery, the rechargeable battery may be a wired rechargeable battery or a wireless rechargeable battery. The rechargeable battery may be further configured to support a fast charge technology.

In some embodiments, the terminal 1200 further includes one or more sensors 1210. The one or more sensors 1210 include, but are not limited to: an acceleration sensor 1211, a gyroscope sensor 1212, a pressure sensor 1213, a fingerprint sensor 1214, an optical sensor 1215, and a proximity sensor 1216.

The acceleration sensor 1211 may detect a magnitude of acceleration on three coordinate axes of a coordinate system established with the terminal 1200. For example, the acceleration sensor 1211 may be configured to detect a component of gravity acceleration on the three coordinate axes. The processor 1201 may control, according to a gravity acceleration signal collected by the acceleration sensor 1211, the touch display screen 1205 to display the UI in a frame view or a portrait view. The acceleration sensor 1211 may be further configured to collect motion data of a game or a user.

The gyroscope sensor 1212 may detect a body direction and a rotation angle of the terminal 1200. The gyroscope sensor 1212 may work with the acceleration sensor 1211 to acquire a 3D action performed by the user on the terminal 1200. The processor 1201 may implement the following functions according to data collected by the gyroscope sensor 1212: motion sensing (for example, the UI is changed according to a tilt operation of the user), image stabilization during shooting, game control, and inertial navigation.

The pressure sensor 1213 may be disposed on a side frame of the terminal 1200 and/or a lower layer of the touch display screen 1205. When the pressure sensor 1213 is disposed on the side frame of the terminal 1200, a holding signal of the user on the terminal 1200 may be detected. The processor 1201 performs left and right hand recognition or a quick operation according to the holding signal collected by the pressure sensor 1213. When the pressure sensor 1213 is disposed on the low layer of the touch display screen 1205, the processor 1201 controls, according to a pressure operation of the user on the touch display screen 1205, an operable control on the UI. The operable control includes at least one of a button control, a scroll bar control, an icon control, and a menu control.

The fingerprint sensor 1214 is configured to collect a fingerprint of the user. The processor 1201 identifies an identity of the user according to the fingerprint collected by the fingerprint sensor 1414, or the fingerprint sensor 1214 identifies an identity of the user according to the collected fingerprint. When the identity of the user is identified as a trusted identity, the processor 1201 authorizes the user to perform a related sensitive operation. The sensitive operation includes unlocking a screen, viewing encrypted information, downloading software, payment, changing settings, and the like. The fingerprint sensor 1214 may be disposed on a front face, a back face, or a side face of the terminal 1200. When the terminal 1200 is provided with a physical button or a vendor logo, the fingerprint sensor 1214 may be integrated with the physical button or the vendor logo.

The optical sensor 1215 is configured to collect ambient light intensity. In an embodiment, the processor 1201 may control display luminance of the touch display screen 1205 according to the ambient light intensity collected by the optical sensor 1215. When the ambient light intensity is relatively high, the display luminance of the display screen 1205 is increased. When the ambient light intensity is relatively low, the display luminance of the display screen 1205 is reduced. In another embodiment, the processor 1201 may further dynamically adjust a shooting parameter of the camera component 1206 according to the ambient light intensity collected by the optical sensor 1215.

The proximity sensor 1216, also referred to as a distance sensor, is usually disposed on the front panel of the terminal 1200. The proximity sensor 1216 is configured to collect a distance between the user and the front surface of the terminal 1200. In an embodiment, when the proximity sensor 1216 detects that the distance between the user and the front surface of the terminal 1200 gradually becomes smaller, the touchscreen 1205 is controlled by the processor 1201 to switch from a screen-on state to a screen-off state. When or in response to determining that the proximity sensor 1216 detects that the distance between the user and the front surface of the terminal 1200 gradually becomes larger, the touchscreen 1205 is controlled by the processor 1201 to switch from the screen-off state to the screen-on state.

A person skilled in the art may understand that the structure shown in FIG. 12 does not constitute a limitation to the terminal 1200, and the terminal may include more or fewer components than those shown in the figure, or some components may be combined, or a different component deployment may be used.

Figure 13:
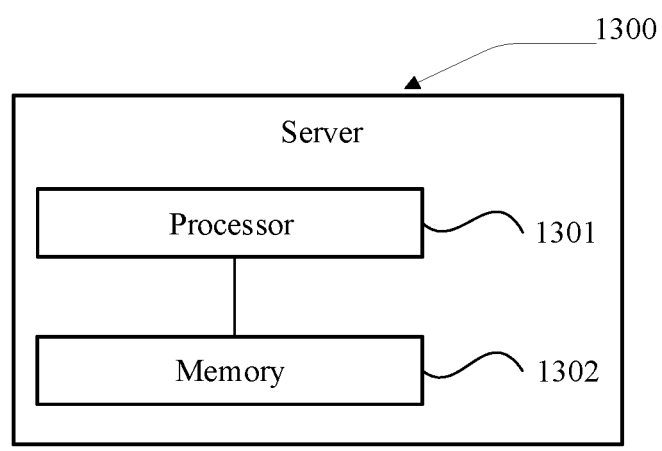
FIG. 13 is a schematic structural diagram of a server according to one or more embodiments of the present disclosure.

FIG. 13 is a schematic structural diagram of a server according to an embodiment of the present disclosure. A server 1300 may vary greatly depending on the configuration or performance. The server 1300 may include one or more CPUs 1301, and one or more memories 1302. The memory 1302 stores at least one program code. The at least one program code is loaded and executed by the processor 1301, to realize the method according to each method embodiment described above. The server may further have a wired or wireless network interface, a keyboard, an input/output interface and other components to facilitate input/output. The server may further include other components for implementing device functions. Details are not described herein again.

The server 1300 may be used to perform the operations performed by the server, the first server, and the second server in the call method.

An embodiment of the present disclosure provides a server for mixing, including a memory and a processor. The memory stores computer-readable instructions. The computer-readable instructions, when executed by the processor, cause the processor to perform the operations in the call method. The operations in the call method herein may be the operations in the call method of each of the embodiments.

An embodiment of the present disclosure also provides a computer-readable storage medium, storing computer-readable instructions. The computer-readable instructions, when executed by a processor, cause the processor to perform the operations in the call method. The operations in the call method herein may be the operations in the call method of each of the embodiments.

An embodiment of the present disclosure also provides a computer program. The computer program includes at least one computer-readable instruction. The at least one computer-readable instruction is loaded and executed by a processor, to cause the processor to perform the operations in the call method. The operations in the call method herein may be the operations in the call method of each of the embodiments.

A person of ordinary skill in the art may understand that all or some procedures in the methods in the embodiments may be implemented by computer-readable instructions instructing relevant hardware. The program may be stored in a non-volatile computer-readable storage medium. When the program is executed, the procedures of the method embodiments may be implemented. References to the memory, the storage, the database, or other medium used in the embodiments provided in the present disclosure may all include a non-volatile or a volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external high-speed cache. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a RAM bus (Rambus) direct RAM (RDRAM), a direct Rambus dynamic RAM (DRDRAM), and a Rambus dynamic RAM (RDRAM).

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The technical features in the embodiments may be combined in any suitable order and/or combination. For concise description, not all possible combinations of the technical features in the embodiments are described. However, provided that combinations of the technical features do not conflict with each other, the combinations of the technical features are considered as falling within the scope described in the present disclosure.

The embodiments only describe several implementations of the present disclosure, but cannot be construed as a limitation to the patent scope of the present disclosure. For a person of ordinary skill in the art, several transformations and improvements can be made without departing from the idea of the present disclosure. These transformations and improvements belong to the protection scope of the present disclosure. Therefore, the protection scope of the patent of the present disclosure shall be subject to the appended claims.

What is claimed is:

1. A call method, performed by a server, and comprising:
   obtaining at least three paths of voice data transmitted by at least three first terminals, the at least three paths of voice data each carrying a piece of indication information, the piece of indication information including a piece of voice activity detection (VAD) information and voice energy, the piece of VAD information being configured for indicating whether the corresponding path of voice data includes a voice segment;
   selecting at least two paths of target voice data that include voice segments and have largest voice energies from the at least three paths of voice data according to the pieces of VAD information and the voice energies of the at least three paths of voice data as obtained, a number of paths of the at least two paths of target voice data being less than a number of paths of the at least three paths of voice data; and
   transmitting the at least two paths of target voice data to a second terminal, the second terminal being configured to decode the at least two paths of target voice data, mix decoded at least two paths of target voice data, and play mixed voice data, wherein the second terminal is a terminal in a call group, and the at least three first terminals are terminals in the call group that are different from the second terminal.

2. The call method according to claim 1, wherein selecting the at least two paths of target voice data from the at least three paths of voice data comprises:
   selecting at least two paths of target voice data that include voice segments from the at least three paths of voice data, according to the pieces of VAD information of the at least three paths of voice data as obtained.

3. The call method according to claim 1, wherein the piece of indication information further includes a voice energy, and selecting the at least two paths of target voice data from the at least three paths of voice data comprises:
   obtaining an arrangement order of the at least three paths of voice data according to the pieces of VAD information and the voice energies of the at least three paths of voice data as obtained, a path of voice data that includes a voice segment being ranked ahead of a path of voice data that does not include a voice segment, and in the paths of voice data that include voice segments, a path of voice data with a larger voice energy being ranked ahead of a path of voice data with a smaller voice energy; and
   selecting a preset number of paths of voice data that are ranked highest according to the arrangement order of the at least three paths of voice data as a preset number of paths of target voice data, the preset number being less than a number of paths of the at least three paths of voice data.

4. The call method according to claim 1, wherein selecting the at least two paths of target voice data from the at least three paths of voice data comprises:
   adding first voice data to a target voice data list, in response to determining that the first voice data in the at least three paths of voice data includes a voice segment, and a number of paths of voice data in the target voice data list has not reached a preset number, the target voice data list being configured for storing a selected path of target voice data, and the preset number being less than a number of paths of the at least three paths of voice data.

5. The call method according to claim 4, further comprising:
   comparing the voice energy of the first voice data with the voice energy of second voice data that has a smallest voice energy in the target voice data list, in response to determining that the first voice data includes a voice segment, and the number of the paths of voice data in the target voice data list has reached the preset number; and
   adding the first voice data to the target voice data list, in response to determining that the voice energy of the first voice data is greater than the voice energy of the second voice data, and removing the second voice data from the target voice data list.

6. The call method according to claim 4, further comprising:
   adding the first voice data to a candidate voice data list, in response to determining that the first voice data does not include a voice segment.

7. The call method according to claim 6, wherein the candidate voice data list includes a first candidate voice data list and a second candidate voice data list, and adding the first voice data to the candidate voice data list comprises:
   adding the first voice data to the first candidate voice data list, in response to determining that the first voice data does not include a voice segment, and the first terminal corresponding to the first voice data is a designated terminal, the designated terminal being a terminal whose previously transmitted path of voice data is selected as a path of target voice data.

8. The call method according to claim 6, wherein adding the first voice data to the candidate voice data list comprises:
adding the first voice data to a second candidate voice data list, in response to determining that the first voice data does not include a voice segment, and the first terminal corresponding to the first voice data is not a designated terminal.

9. The call method according to claim 1, wherein selecting the at least two paths of target voice data from the at least three paths of voice data comprises:
traversing the at least three paths of voice data as obtained, and determining a target voice data list and a candidate voice data list according to the pieces of indication information of the at least three paths of voice data, the target voice data list being configured for storing a currently selected path of voice data, and the candidate voice data list being configured for storing a currently unselected path of voice data; and
after traversing the at least three paths of voice data, selecting at least one path of voice data from the candidate voice data list, in response to determining that a number of paths of voice data in the target voice data list is less than a preset number, and adding the one path of voice data to the target voice data list, so that the number of the paths of voice data in the target voice data list is equal to the preset number, the preset number being less than a number of paths of the at least three paths of voice data.

10. The call method according to claim 9, wherein the candidate voice data list includes a first candidate voice data list and a second candidate voice data list, the first candidate voice data list is configured for storing a path of voice data that does not include a voice segment and the corresponding first terminal is a designated terminal, the second candidate voice data list is configured for storing a path of voice data that does not include a voice segment and the corresponding first terminal is not a designated terminal, and the designated terminal is a terminal whose previously transmitted path of voice data is selected as a path of target voice data.

11. The call method according to claim 9, wherein selecting the at least one path of voice data from the candidate voice data list and adding the one path of voice data to the target voice data list comprises:
selecting at least one path of voice data from the first candidate voice data list, in response to determining that the number of the paths of voice data in the target voice data list is less than the preset number, and adding the at least one path of voice data to the target voice data list, so that the number of the paths of voice data in the target voice data list is equal to the preset number.

12. The call method according to claim 9, wherein selecting the at least one path of voice data from the candidate voice data list and adding the one path of voice data to the target voice data list comprises:
adding all of paths of voice data in the first candidate voice data list to the target voice data list, in response to determining that the number of the paths of voice data in the target voice data list is less than the preset number, the number of paths of voice data in the target voice data list after adding the paths of voice data being not greater than the preset number; and selecting at least one path of voice data from the second candidate voice data list, and adding the at least one path of voice data to the target voice data list, so that the number of the paths of voice data in the target voice data list is equal to the preset number.

13. A call apparatus, comprising: a memory storing computer program instructions; and at least one processor coupled to the memory and configured to execute the computer program instructions and perform:
obtaining at least three paths of voice data transmitted by at least three first terminals, the at least three paths of voice data each carrying a piece of indication information, the piece of indication information including a piece of voice activity detection (VAD) information and voice energy, the piece of VAD information being configured for indicating whether the corresponding path of voice data includes a voice segment;
selecting at least two paths of target voice data that include voice segments and have largest voice energies from the at least three paths of voice data according to the pieces of VAD information and the voice energies of the at least three paths of voice data as obtained, a number of paths of the at least two paths of target voice data being less than a number of paths of the at least three paths of voice data; and
transmitting the at least two paths of target voice data to a second terminal, the second terminal being configured to decode the at least two paths of target voice data, mix decoded at least two paths of target voice data, and play mixed voice data, wherein the second terminal is a terminal in a call group, and the at least three first terminals are terminals in the call group that are different from the second terminal.

14. The call apparatus according to claim 13, wherein selecting the at least two paths of target voice data from the at least three paths of voice data includes:
selecting at least two paths of target voice data that include voice segments from the at least three paths of voice data, according to the pieces of VAD information of the at least three paths of voice data as obtained.

15. The call apparatus according to claim 13, wherein the piece of indication information further includes a voice energy, and selecting the at least two paths of target voice data from the at least three paths of voice data includes:
obtaining an arrangement order of the at least three paths of voice data according to the pieces of VAD information and the voice energies of the at least three paths of voice data as obtained, a path of voice data that includes a voice segment being ranked ahead of a path of voice data that does not include a voice segment, and in the paths of voice data that include voice segments, a path of voice data with a larger voice energy being ranked ahead of a path of voice data with a smaller voice energy; and
selecting a preset number of paths of voice data that are ranked highest according to the arrangement order of the at least three paths of voice data as a preset number of paths of target voice data, the preset number being less than a number of paths of the at least three paths of voice data.

16. The call apparatus according to claim 13, wherein selecting the at least two paths of target voice data from the at least three paths of voice data includes:
adding first voice data to a target voice data list, in response to determining that the first voice data in the at least three paths of voice data includes a voice segment, and a number of paths of voice data in the target voice data list has not reached a preset number, the target voice data list being configured for storing a selected path of target voice data, and the preset number being less than a number of paths of the at least three paths of voice data.

17. The call apparatus according to claim 16, wherein the at least one processor is further configured to execute the computer program instructions and perform:

comparing the voice energy of the first voice data with the voice energy of second voice data that has a smallest voice energy in the target voice data list, in response to determining that the first voice data includes a voice segment, and the number of the paths of voice data in the target voice data list has reached the preset number; and adding the first voice data to the target voice data list, in response to determining that the voice energy of the first voice data is greater than the voice energy of the second voice data, and removing the second voice data from the target voice data list.

18. A non-transitory computer-readable storage medium storing computer program instructions executable by at least one processor to perform:

obtaining at least three paths of voice data transmitted by at least three first terminals, the at least three paths of voice data each carrying a piece of indication information, the piece of indication information including a piece of voice activity detection (VAD) information and voice energy, the piece of VAD information being configured for indicating whether the corresponding path of voice data includes a voice segment;

selecting at least two paths of target voice data that include voice segments and have largest voice energies from the at least three paths of voice data according to the pieces of VAD information and the voice energies of the at least three paths of voice data as obtained, a number of paths of the at least two paths of target voice data being less than a number of paths of the at least three paths of voice data; and transmitting the at least two paths of target voice data to a second terminal, the second terminal being configured to decode the at least two paths of target voice data, mix decoded at least two paths of target voice data, and play mixed voice data, wherein the second terminal is a terminal in a call group, and the at least three first terminals are terminals in the call group that are different from the second terminal.

\* \* \* \* \*